(12) United States Patent
Hasuka

(10) Patent No.: US 8,192,884 B2
(45) Date of Patent: Jun. 5, 2012

(54) FUEL CELL SYSTEM AND MOBILE OBJECT

(75) Inventor: Yoshinobu Hasuka, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 389 days.

(21) Appl. No.: 12/669,627

(22) PCT Filed: Jul. 8, 2008

(86) PCT No.: PCT/JP2008/062657
§ 371 (c)(1),
(2), (4) Date: Jan. 19, 2010

(87) PCT Pub. No.: WO2009/011324
PCT Pub. Date: Jan. 22, 2009

(65) Prior Publication Data
US 2010/0203411 A1 Aug. 12, 2010

(30) Foreign Application Priority Data
Jul. 19, 2007 (JP) .................................. 2007-188529

(51) Int. Cl.
*H01M 8/04* (2006.01)
(52) U.S. Cl. ........ 429/442; 429/433; 429/429; 429/428; 429/443

(58) Field of Classification Search .................. 429/442, 429/429, 433, 428, 443
See application file for complete search history.

(56) References Cited

U.S. PATENT DOCUMENTS
2007/0243437 A1  10/2007  Katano

FOREIGN PATENT DOCUMENTS

| JP | 06-275300 | 9/1994 |
|---|---|---|
| JP | 2002-305017 A | 10/2002 |
| JP | 2004-179054 A | 6/2004 |
| JP | 2005-93231 A | 4/2005 |
| JP | 2005-100846 A | 4/2005 |
| JP | 2005-327597 A | 11/2005 |
| JP | 2006-40846 A | 2/2006 |
| JP | 2007-26808 A | 2/2007 |
| JP | 2007-35389 A | 2/2007 |
| JP | 2007-123040 A | 5/2007 |

*Primary Examiner* — Helen O Conley
(74) *Attorney, Agent, or Firm* — Kenyon & Kenyon LLP

(57) ABSTRACT

A fuel cell system of the present invention is provided with a fuel cell, a fuel gas supply system that supplies a fuel gas to the fuel cell, and an oxidant gas supply system that supplies an oxidant gas to the fuel cell, and, when operation end processing is started, a flow rate of the fuel gas supplied to the fuel cell is increased only by a predetermined amount that is determined based on a temperature environment of the fuel cell system. As a result, when the operation of the fuel cell system is ended, the fuel gas at the optimum flow rate in accordance with the temperature environment is provided, thereby efficiently preventing deterioration of the fuel cell after the end of the operation.

6 Claims, 3 Drawing Sheets

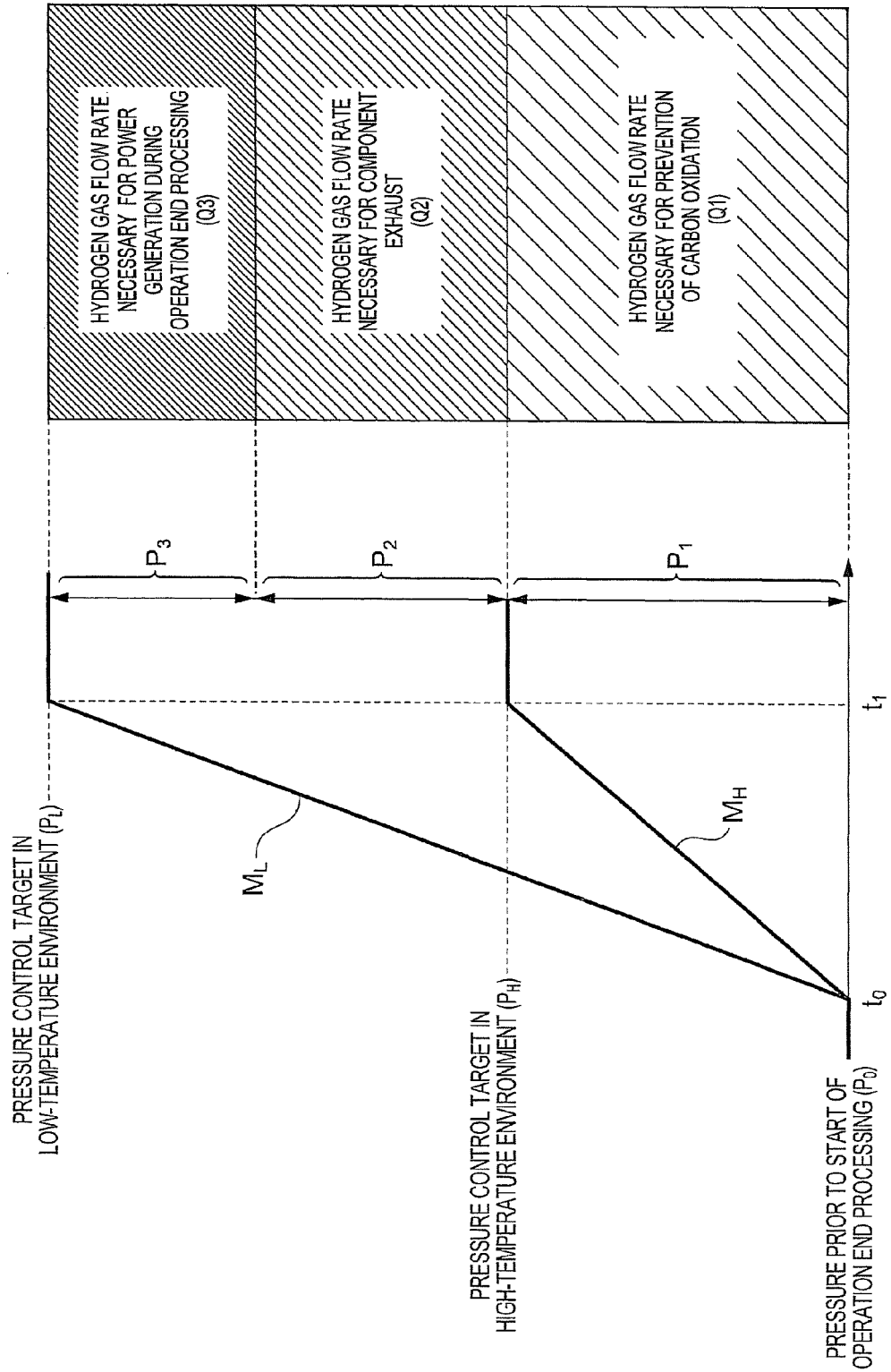

FUEL CELL SYSTEM AND MOBILE OBJECT

This is a 371 national phase application of PCT/JP2008/062657 filed 8 Jul. 2008, which claims priority to Japanese Patent Application No. 2007-188529 filed 19 Jul. 2007, the contents of which are incorporated herein by reference.

TECHNICAL FIELD

The present invention relates to a fuel cell system and a mobile object, and particularly relates to a control technique employed when the operation of the fuel cell system and the mobile object is ended.

BACKGROUND ART

In recent years, a fuel cell system has been proposed which is provided with a fuel cell which directly takes out, as electrical energy, chemical energy resulting from an oxidation-reduction reaction between a fuel gas such as a hydrogen gas supplied to a fuel electrode (anode) and an oxidant gas such as air supplied to an air electrode (cathode).

In such a fuel cell system, a phenomenon is known in which, after the operation of the system is ended, air flows into an anode, so that, for example, carbon carrying catalysts of a separator and the anode is oxidized (hereinafter referred to as carbon oxidation), leading to a reduction in the life of a fuel cell.

In light of the above, for example, in the fuel cell system disclosed in JP2005-100846 A, a technique is proposed in which deterioration of a fuel cell is prevented with the supply of an inert gas to an anode and a cathode when the operation of the system is ended.

DISCLOSURE OF THE INVENTION

However, the above fuel cell system requires a means for supplying an inert gas, which makes the system complicated. Also, since the temperature environment at the time when the operation of the fuel cell system is ended is not considered, the optimum gas flow rate for the temperature environment may not be reserved when the operation is ended.

In light of the above circumstances, the present invention has an object to provide a fuel cell system and a mobile object in which a fuel gas at the optimum flow rate in accordance with a temperature environment is provided when the operation of the fuel cell system is ended, thereby efficiently preventing deterioration of a fuel cell after the end of the operation.

In the present invention, the following means is employed in order to attain the above object. The invention provides a fuel cell system including: a fuel cell; a fuel gas supply system that supplies a fuel gas to the fuel cell; and an oxidant gas supply system that supplies an oxidant gas to the fuel cell, in which, when operation end processing for the fuel cell system is started, a flow rate of the fuel gas supplied to the fuel cell is increased by a predetermined amount that is determined based on a temperature environment of the fuel cell system.

With this configuration, the flow rate of the fuel gas is increased based on the temperature environment at the start of the operation end processing of the fuel cell system. Therefore, the fuel gas at the optimum flow rate in accordance with the temperature environment can be provided during the operation end processing and after the operation end processing. Accordingly, deterioration of the fuel cell which results from a lack of fuel gas can be prevented efficiently.

Note that, in this specification, the "temperature environment" typically refers to a temperature(s) acquired at one or more locations inside or outside the fuel cell system.

Also, in the fuel cell system, when the temperature environment has a temperature equal to or lower than a predetermined temperature, the predetermined amount may be determined based on a total value of at least a first fuel gas flow rate necessary for leaving the fuel gas in the fuel cell at the end of the operation end processing and a second fuel gas flow rate necessary for discharging water in the fuel cell to the outside during the operation end processing.

With this configuration, water in the fuel cell can be discharged to the outside at the second fuel gas flow rate, which has been increased at the start of the operation end processing, during the operation end processing. Accordingly, the water remaining in the fuel cell due to the lowering of the temperature inside the fuel cell after the end of the operation can be prevented from freezing even when the temperature environment is a low-temperature environment at a temperature equal to or lower than the predetermined temperature. Also, even if the fuel gas is used for the discharge of water during the operation end processing, the fuel gas can be made to remain in the fuel cell even after the end of the operation because of the increased first fuel gas flow rate. Accordingly, carbon oxidation can also be prevented.

In the fuel cell system, the predetermined amount may be determined based on a total value obtained by further adding, to the first and second fuel gas flow rates, a third fuel gas flow rate necessary for the fuel cell to output, during the operation end processing, a current necessary for the operation end processing.

With this configuration, by using the increased third fuel gas flow rate for power generation of the fuel cell system, the fuel cell system can reserve, by itself, the current necessary for the operation end processing in the low-temperature environment. This is, in a system in which a current necessary for device operation during operation end processing can be supplied from a power accumulating means such as a battery or a capacitor, efficient compared with the case where the current necessary for the operation end processing is obtained from the power accumulating means, such as the battery or the capacitor, in which an output tends to decrease in the low-temperature environment. From another point of view, this means that power of the power accumulating means such as the battery or the capacitor is left for the start of the fuel cell system.

Note that "based on a total value" indicates that the total value is based on the calculation of the predetermined amount, and "determined based on a total value" includes, e.g., the case where the total value is used as the predetermined amount as it is, and the case where the value obtained by adding, to the total value, e.g., the value of gas leakage in the fuel cell system is used as the predetermined amount. In addition, "device operation during the operation end processing" refers to, e.g., an operation of collecting water in a gas-liquid separator, a rotation operation of a hydrogen pump, an injection operation of an injector, and an opening/closing operation of, e.g., an exhaust/drain valve.

In the fuel cell system, when the temperature environment has a temperature higher than the predetermined temperature, the predetermined amount may be determined based on the first fuel gas flow rate.

With this configuration, the fuel gas can be made to remain in the fuel cell even after the end of the operation because of the increased first fuel gas flow rate, and therefore, carbon oxidation can be prevented. In addition, processing such as a water discharge is not required at the end of the operation (in other words, fuel gas for the water discharge is not required) when the temperature environment is a high-temperature environment at a temperature higher than the predetermined temperature; meanwhile, the predetermined amount is determined based on the first fuel gas flow rate, and thus, the fuel gas is not supplied at an excess flow rate. As described above, the flow rate of the fuel gas increased at the start of the operation end processing is different between the low-temperature environment and the high-temperature environment, whereby deterioration of the fuel cell after the end of the operation can be prevented with the fuel gas at the optimum flow rate in accordance with the temperature environment.

In the fuel cell system, a supply pressure of the fuel gas may be increased by an injector provided in the fuel gas supply system, thereby increasing the flow rate of the fuel gas.

The injector in this specification is typically configured as an electromagnetic drive type on-off valve in which a valve body is directly driven with an electromagnetic driving force with a predetermined drive period so as to be separated from a valve seat, thereby controlling a gas state (which indicates a gas state represented by a flow rate, pressure, temperature, mol concentration, etc., and particularly includes at least one of a gas flow rate and a gas pressure). Pressure control can be carried out with high precision and in rapid manner by such an injector, and therefore, the fuel gas at the optimum flow rate can be supplied to the fuel cell at the start of the operation end processing. Also, the flow rate is controlled based on pressure, and therefore, the flow rate can also be controlled while a differential pressure between an anode and a cathode is kept within a predetermined range.

Moreover, the mobile object of the invention is provided with the above fuel cell system.

With this configuration, the fuel gas at the optimum flow rate in accordance with the temperature environment where the mobile object is placed can be supplied during the operation end processing and after the operation end processing for the mobile object. Therefore, deterioration of the fuel cell can be prevented, and an improvement in fuel efficiency and an improvement in reliability of the mobile object can be attained accordingly.

As described above, according to the present invention, the fuel cell system and the mobile object in which a fuel gas at the optimum flow rate in accordance with a temperature environment is provided when the operation of the fuel cell system is ended, thereby efficiently preventing deterioration of a fuel cell after the end of the operation, can be provided.

BRIEF DESCRIPTION OF THE DRAWINGS

FIG. 3 is a diagram explaining a pressure control target when the operation end processing is started according to the embodiment.

BEST MODE FOR CARRYING OUT THE INVENTION

Figure 1:
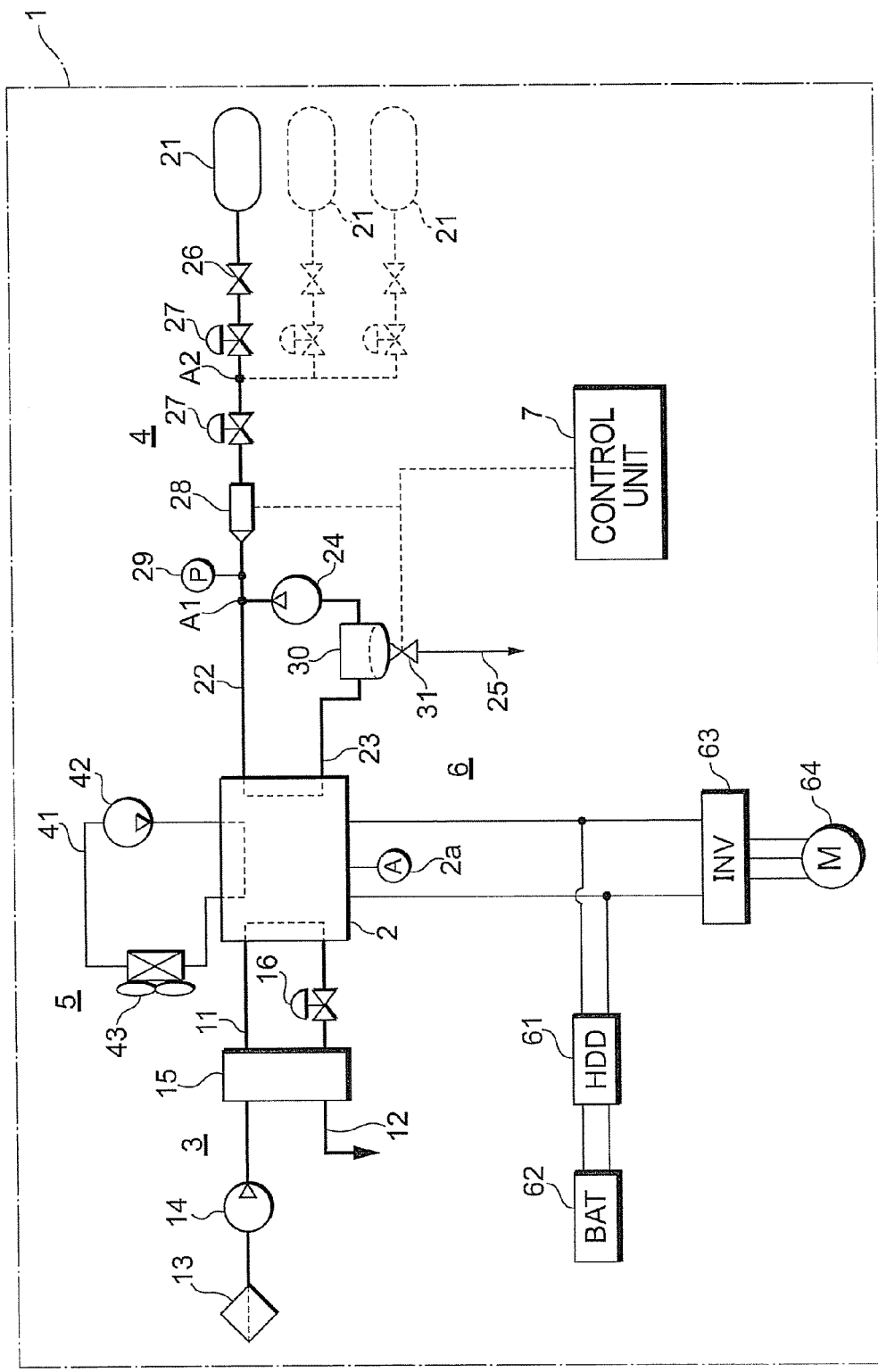
FIG. 1 is a configuration diagram of a fuel cell system according to an embodiment of the invention.

A fuel cell system according to an embodiment of the invention will be described in the order shown below with reference to the attached drawings.
1. Overall configuration of the fuel cell system according to the embodiment of the invention
2. Operation end processing for the fuel cell system according to the embodiment of the invention
3. Modification example of the fuel cell system according to the embodiment of the invention In the figures, the same reference numerals are given to the same components.

1. Overall Configuration of the Fuel Cell System According to the Embodiment of the Invention In this embodiment, the case of utilizing the invention in a power generation system mounted on a fuel cell vehicle (mobile object) will be described.

First, the configuration of a fuel cell system 1 according to the embodiment of the invention will be described with reference to FIG. 1. As shown in FIG. 1, the fuel cell system 1 according to the embodiment is provided with: a fuel cell 2 which generates electric power upon the supply of reaction gases (oxide gas and fuel gas); an oxidant gas pipe system 3 which supplies air serving as the oxidant gas to the fuel cell 2; a fuel gas pipe system 4 which supplies a hydrogen gas serving as the fuel gas to the fuel cell 2; a coolant pipe system 5 which supplies a coolant to the fuel cell 2 to cool the fuel cell 2; a power system 6 which charges/discharges electric power of the system; and a control unit 7 which controls the entire system.

The fuel cell 2 is configured as, e.g., a solid polymer electrolyte fuel cell, and has a stack structure in which a large number of single cells are stacked. A single cell of the fuel cell 2 has an air electrode (cathode) on one of surfaces of an electrolyte constituted of an ion-exchange membrane and a fuel electrode (anode) on the other surface, and further has a pair of separators so as to sandwich the cathode and the anode on both of the sides thereof. A fuel gas is supplied to a fuel gas flow path of one of the separators, and an oxidant gas is supplied to an oxidant gas flow path of the other separator. With this gas supply, the fuel cell 2 generates electric power. Attached to the fuel cell 2 is a current sensor 2a that detects a current during power generation. A carbon material serving as a base which carries a catalyst of, e.g., platinum (to which the catalyst is bound) is used for the anode and the cathode.

The oxidant gas pipe system 3 has an air supply flow path 11 in which air serving as an oxidant gas to be supplied to the fuel cell 2 flows; and an exhaust flow path 12 in which an oxidant-off gas discharged from the fuel cell 2 flows. The air supply flow path 11 is provided with a compressor 14 for taking in the oxidant gas through a filter 13 and a humidifier 15 for humidifying the oxidant gas pumped from the compressor 14. The oxidant-off gas flowing in the exhaust flow path 12 passes through a backpressure regulating valve 16 and is subjected to water exchange in the humidifier 15, and is eventually exhausted as exhaust air into the atmosphere outside the system. The compressor 14 takes in oxidant gas in the atmosphere with the drive of a not-shown motor.

The fuel gas pipe system 4 includes: a hydrogen supply source 21; a hydrogen supply flow path 22 in which a hydrogen gas serving as a fuel gas to be supplied from the hydrogen supply source 21 to the fuel cell 2 flows; a circulation flow path 23 for returning a hydrogen-off gas (fuel-off gas) discharged from the fuel cell 2 to a junction A1 of the hydrogen supply flow path 22; a hydrogen pump 24 for pumping the hydrogen-off gas in the circulation flow path 23 to the hydrogen supply flow path 22; and an exhaust/drain flow path 25 which has a branch connection with the circulation flow path 23.

The hydrogen gas supply source 21 is constituted by a high-voltage tank, hydrogen absorbing alloys, etc., and is configured to be able to store hydrogen gas at, e.g., 35 MPa or 70 MPa. When a cutoff valve 26 is opened, the hydrogen gas is flown from the hydrogen supply source 21 to the hydrogen gas flow path 22. The pressure of the hydrogen gas is eventually reduced to approximately, e.g., 200 kPa by regulators 27 and an injector 28, which will be described below, and the resultant gas is supplied to the fuel cell 2. Note that the hydrogen supply source 21 may be constituted by a reformer for producing hydrogen-enriched reformed gas from hydrocarbon fuel and a high-pressure gas tank which brings the reformed gas produced by the reformer into a high-pressure state and stores the resultant gas. A tank containing a hydrogen absorbing alloy may also be employed as the hydrogen supply source 21.

The hydrogen supply flow path 22 is provided with: the cutoff valve 26 for interrupting or allowing the supply of hydrogen gas from the hydrogen supply source 21; the regulators 27 and the injector 28 each for regulating the pressure of hydrogen gas. Also, a pressure sensor 29 for detecting the pressure of the hydrogen gas in the hydrogen supply flow path 22 is provided on the downstream side of the injector 28 and on the upstream side of the junction A1 between the hydrogen supply flow path 22 and the circulation flow path 23. Moreover, provided on the upstream side of the injector 28 are a not-shown pressure sensor and a not-shown temperature sensor for respectively detecting the pressure and the temperature of the hydrogen gas in the hydrogen supply flow path 22. Information on a gas state (pressure, temperature) detected by the pressure sensor 29, etc. is used for feedback control and purge control of the injector 28.

Each of the regulators 27 is a device for regulating the pressure on the upstream side (primary pressure) to a preset secondary pressure. In this embodiment, a mechanical pressure reducing valve for reducing the primary pressure is employed as the regulator 27. A known configuration in which: a casing having a backpressure chamber and a pressure regulating chamber separated by a diaphragm is provided; and, with the backpressure in the backpressure chamber, the primary pressure is reduced to a predetermined pressure in the pressure regulating chamber, thereby obtaining the secondary pressure, may be employed as a configuration of the mechanical pressure reducing valve. In this embodiment, the two regulators 27 are arranged upstream of the injector 28 as shown in FIG. 1, whereby the pressure on the upstream side of the injector 28 can be reduced effectively. Therefore, the degree of freedom of the mechanical configuration (a valve body, casing, flow path, driving device, etc.) of the injector 28 can be enhanced. Also, the pressure on the upstream side of the injector 28 can be decreased, thereby preventing the valve body of the injector 28 from becoming difficult to move due to the increase in differential pressure between the upstream pressure and the downstream pressure of the injector 28. Accordingly, a variable pressure regulating width of the downstream-side pressure of the injector 28 can be extended, and also the reduction of responsibility of the injector 28 can be prevented. The regulator 27 regulates the gas state (gas pressure) on the upstream side of the hydrogen supply flow path 22 and supplies the resultant gas to the downstream side, and corresponds to a variable gas supply device in the invention.

The injector 28 is an electromagnetic drive type on-off valve having a configuration in which a valve body is directly driven with an electromagnetic driving force with a predetermined drive period so as to be separated from a valve seat, thereby controlling a gas flow rate and gas pressure. The injector 28 is provided with a valve seat having an injection hole through which gas fuel such as a hydrogen gas is injected, and is also provided with: a nozzle body for supplying and guiding the gas fuel to the injection hole; and a valve body which is held to be contained in a movable manner in an axial direction (gas flow direction) with respect to the nozzle body and which opens/closes the injection hole. In this embodiment, the valve body of the injector 28 is driven by a solenoid, which is an electromagnetic device, and switching of the opening area of the injection hole in two or more levels can be attained with the on/off of a pulsed excitation current of electric power supplied to the solenoid. Control signals output from the control unit 7 control a gas injection period and a gas injection time of the injector 28, thereby controlling the flow rate and pressure of the hydrogen gas with high accuracy. The injector 28 is configured such that the valve (valve body and valve seat) is driven to be opened and closed directly with an electromagnetic driving force, and has high responsibility since a drive period thereof can be controlled to attain the extent of high response.

In the injector 28, in order to supply gas at a flow rate required for the downstream, at least one of the opening area (degree of opening) and the open time of the valve body provided in a gas flow path of the injector 28 is changed, thereby adjusting the flow rate (or hydrogen mol concentration) of the gas supplied to the downstream side (fuel cell 2 side). Note that, since the gas flow rate is adjusted by opening/closing the valve body of the injector 28, and also, the pressure of the gas supplied to the downstream side of the injector 28 is reduced to be lower than the pressure of the gas on the upstream side of the injector 28, the injector 28 may be interpreted as a pressure regulating valve (pressure reducing valve, regulator). In this embodiment, the injector 28 may also be interpreted as a variable pressure regulating valve that can vary an amount of pressure control (pressure reduction) of the pressure of the gas on the upstream side of the injector 28 so as to meet a required pressure within a predetermined pressure range in response to a request for gas. The injector 28 adjusts the gas state (gas flow rate, hydrogen mol concentration and gas pressure) on the upstream side of the hydrogen supply flow path 22 and supplies the resultant gas to the downstream side.

In this embodiment, the injector 28 is arranged upstream of the junction A1 between the hydrogen supply flow path 22 and the circulation path 23, as shown in FIG. 1. Also, when using a plurality of hydrogen supply sources 21 as fuel supply sources as shown by the dashed line in FIG. 1, the injector 28 is arranged on the downstream side of the portion (hydrogen gas junction portion A2) where the hydrogen gases respectively supplied from the hydrogen supply sources 21 merge with each other.

Connected to the circulation flow path 23 is the exhaust/drain flow path 25 through a gas-liquid separator 30 and an exhaust/drain valve 31. The gas-liquid separator 30 collects water from a hydrogen-off gas. The exhaust/drain valve 31 is operated in accordance with a command from the control unit 7, thereby discharging (purging) the water collected by the gas-liquid separator 30 and the hydrogen-off gas (fuel-off gas) containing impurities in the circulation flow path 23 to the outside. By opening the exhaust/drain valve 31, the concentration of the impurities contained in the hydrogen-off gas in the circulation path 23 decreases, while the hydrogen concentration of the circulated and supplied hydrogen-off gas increases. An upstream pressure sensor and a downstream pressure sensor, each for detecting a pressure of the hydrogen-off gas, are provided respectively at a position upstream of the exhaust/drain valve 31 (on the circulation path 23) and a position downstream thereof (on the exhaust/drain flow path 25).

The hydrogen-off gas discharged through the exhaust/drain valve 31 and the exhaust/drain flow path 25 is diluted by a not-shown diluter to merge with the oxidant-off gas in the exhaust flow path 12. The hydrogen pump 24 circulates and supplies the hydrogen gas in a circulation system to the fuel cell 2 via a drive of a not-shown motor. The circulation system for hydrogen gas is constituted by the flow path downstream of the junction A1 of the hydrogen supply flow path 22, the fuel gas flow path formed in the separator of the fuel cell 2, and the circulation flow path 23.

The coolant pipe system 5 includes a coolant flow path 41 connected to a cooling flow path in the fuel cell 2, a cooling pump 42 provided in the coolant flow path 41, and a radiator 43 for cooling the coolant discharged from the fuel cell 2. The cooling pump 42 circulates and supplies the coolant in the coolant flow path 41 to the fuel cell 2 via a drive of a not-shown motor.

The power system 6 is provided with a high-voltage DC/DC converter 61, a battery 62, a traction inverter 63, a traction motor 64, not-shown various auxiliary inverters, etc. The high-voltage DC/DC converter 61 is a DC voltage converter, and has the function of adjusting a DC voltage input from the battery 62 to output the resultant DC voltage to the traction inverter 63 and the function of adjusting a DC voltage input from the fuel cell 2 or the traction motor 64 to output the resultant DC voltage to the battery 62. These functions of the high-voltage DC/DC converter 61 attain a charge/discharge of the battery 62. Also, the output voltage of the fuel cell 2 is controlled by the high-voltage DC/DC converter 61.

The battery 62 is constituted of stacked layers of battery cells with a fixed high voltage serving as a terminal voltage, and can perform a charge of surplus power and a supplemental power supply under the control of a not-shown battery computer. The traction inverter 63 converts a direct current into a three-phase alternating current to supply the three-phase alternating current to the traction motor 64. The traction motor 64 is, for example, a three-phase AC motor, and constitutes a main power source of the vehicle on which the fuel cell system 1 is mounted. The auxiliary inverter is a motor control unit for controlling the drive of each motor, and converts a DC current into a three-phase alternating current to supply the three-phase alternating current to each motor. The auxiliary inverter is, for example, a pulse width modulation-type (PWM) inverter. In accordance with control commands from the control unit 7, the auxiliary inverter converts a DC voltage output from the fuel cell 2 or the battery 62 into a three-phase AC voltage, thereby controlling a rotation torque that is generated in each motor.

The control unit 7 detects the operation amount of an acceleration operating member (accelerator, etc.) provided in a vehicle, and controls operation of various devices in the system upon receiving control information such as an acceleration required value (e.g., amount of generation of electric power required from load devices such as the traction motor 64). Note that the load devices include not only the traction motor 64 but also auxiliary apparatuses (e.g., motors for the compressor 14, the hydrogen pump 24 and the cooling pump 42) necessary for operating the fuel cell 2, actuators used in various devices relating to the driving of a vehicle (a change gear, wheel control device, steering device, suspension device, etc.), and power consumption devices including an air-conditioning device (air conditioner), illumination device, and audio equipment in an occupant space.

The control unit 7 is constituted by a not-shown computer system. Such a computer system is provided with a CPU, ROM, RAM, an input/output interface, a display, etc., and the CPU reads various control programs recorded in the ROM to perform a desired calculation, whereby various kinds of processing and controls including operation end processing described later are carried out. The control unit 7 receives inputs of detection signals from various pressure sensors and temperature sensors which are used in the oxidant gas pipe system 3, the fuel gas pipe system 4 and the coolant pipe system 5, a not-shown outdoor air temperature sensor, etc., and outputs control signals to the respective components of the fuel cell system 1.

2. Operation End Processing of the Fuel Cell System According to the Embodiment of the Invention Next, the operation carried out when the operation of the fuel cell system 1 is ended to stop power generation (hereinafter simply referred to as "operation end processing") will be described.

Figure 2:
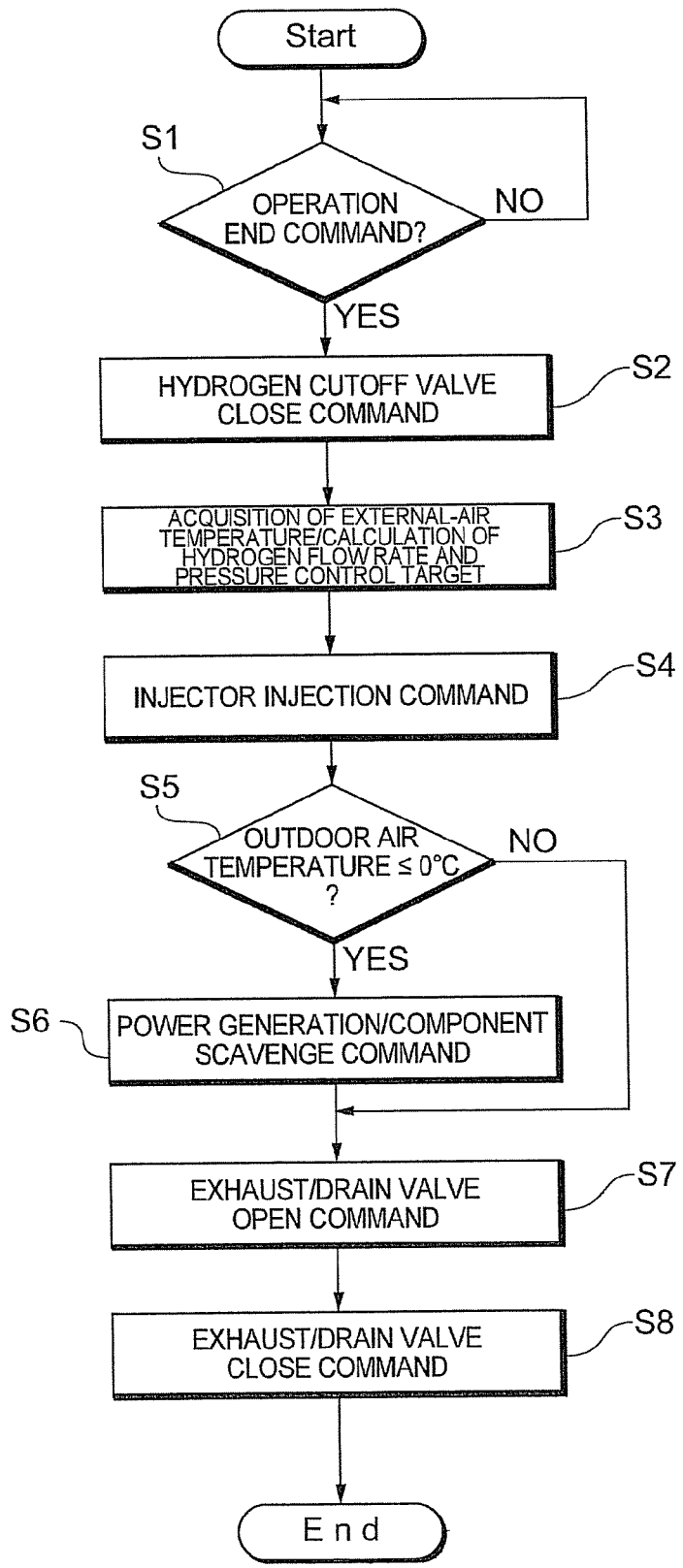
FIG. 2 is a flowchart showing operation end processing according to the embodiment.

In this embodiment, a temperature outside a fuel cell vehicle (hereinafter referred to as outdoor air temperature) is measured when operation end processing is started, and an injection pressure of the injector 28 is increased based on the outdoor air temperature. More specifically, an increase of the injection pressure is different between the case of an outdoor air temperature equal to or lower than the freezing point (hereinafter referred to as low-temperature environment) and the case of an outdoor air temperature above the freezing point (hereinafter referred to as high-temperature environment). This will be described in detail below using FIGS. 2 and 3. Here, FIG. 2 is a flowchart explaining the operation end processing according to the embodiment of the invention. FIG. 3 is a diagram illustrating pressure control targets at the start of the operation end processing.

As shown in FIG. 2, the flow of the operation end processing is started upon the issue of an operation end command to the fuel cell system 1. This command is given, for example, via an off operation of an ignition switch carried out by a vehicle driver. The control unit 7 judges whether or not the operation end command has been input to the control unit 7 (S1). If the control unit 7 determines that the operation end command has been input (S1: YES), the control unit 7 starts the operation end processing. If the control unit 7 determines that the operation end command has not been input (S1: NO), the control unit 7 continues the normal operation.

When the operation end processing is started, the control unit 7 outputs a hydrogen cutoff valve close command in order to close the cutoff valve 26 of the hydrogen supply source 21 to stop a new supply of hydrogen (S2). Processing of closing the cutoff valve 26 is then started (time $t_0$ in FIG. 3). However, a delay in closing the valve occurs, and thus, a given time is required to completely cut off the cutoff valve 26, and the supply of hydrogen gas from the hydrogen supply source 21 does not stop completely until the given time passes (time $t_1$ in FIG. 3). Also, the hydrogen gas remains in the hydrogen supply flow path 22. Therefore, even at this point, the flow rate of the hydrogen gas can be adjusted. This is utilized to increase the flow rate of the hydrogen gas supplied to the fuel cell 2. More specifically, the control unit 7 acquires the outdoor air temperature detected by the outdoor air temperature sensor, and calculates the flow rate of hydrogen for the increase based on that outdoor air temperature (S3). The control unit 7 also calculates the upstream pressure (pressure control target) of the injector 25 which is needed to supply hydrogen at the calculated flow rate to the fuel cell 2 (S3).

A method of calculating a pressure control target based on an outdoor air temperature will be described in more detail with reference to FIG. 3. FIG. 3 (the left part of the figure) shows time histories of injector-upstream pressures at the start of the operation end processing (from time $t_0$ when the command for closing the cutoff valve 26 is given to time $t_1$ when the cutoff valve 26 is completely closed). $M_H$ represents a time history of the injector-upstream pressure in a high-temperature environment, and $M_L$ represents a time history of the injector-upstream pressure in a low-temperature environment. The pressure-control target pressure for the low-temperature environment is set to $P_L$, and the pressure-control target pressure for the high-temperature environment is set to $P_H$.

Here, the pressure-control target pressure $P_L$ for the low-temperature environment is set as shown below. As schematically shown in FIG. 3 (the right part of the figure), the pressure-control target pressure $P_L$ is what is obtained by adding, to the pressure immediately before the start of the operation end processing ($P_0$), a hydrogen partial pressure ($P_1$) corresponding to the hydrogen gas flow rate necessary for preventing carbon oxidation, i.e., the hydrogen gas flow rate necessary for attaining the state where at least the anode of the fuel cell 2 is filled with hydrogen gas (first fuel gas flow rate: $Q_1$), a hydrogen partial pressure ($P_2$) corresponding to the hydrogen gas flow rate necessary for an component exhaust, and a hydrogen partial pressure ($P_3$) corresponding to a hydrogen gas flow rate necessary for power generation during the operation end processing (third fuel gas flow rate: $Q_3$).

Meanwhile, the pressure control target pressure $P_H$ for the high-temperature environment is what is obtained by adding, to the pressure immediately before the start of operation end processing ($P_0$), the hydrogen partial pressure ($P_1$) corresponding to the hydrogen gas flow rate ($Q_1$) necessary for preventing carbon oxidation.

The above explanation is continued by returning to FIG. 2. The control unit 7 carries out a pressure control in the injector 28 such that the injector-upstream pressure attains a pressure control target until time $t_1$ when the cutoff valve 26 is completely closed. The pressure control is realized via the injector 28, and therefore, can be carried out with high precision for a short time. When the upstream pressure of the injector 28 attains the pressure control target, the control unit 7 outputs an injector injection command (S4). The hydrogen gas at a flow rate higher than the flow rate immediately before the start of the operation end processing is supplied to the fuel cell 2 from the injector 28. Specifically, the total value of the hydrogen gas flow rates $Q_1$, $Q_2$ and $Q_3$ for the low-temperature environment or the hydrogen gas flow rate $Q_1$ for the high-temperature environment is provided to the fuel cell 2.

Next, the control unit 7 judges whether an outdoor air temperature is equal to or lower than the freezing point (S5). If the control unit 7 determines that the outdoor air temperature is equal to or lower than the freezing point (S5: YES), the control unit 7 outputs a power generation command and a component scavenge command (S6). Upon the output of the power generation command, the fuel cell 2 continues power generation of the fuel cell 2 using a part of the supplied hydrogen gas (here, $Q_3$). The electric power obtained through this power generation is used in the subsequent operation end processing. Also, upon the output of the component scavenge command, the motor of the hydrogen pump 24 is driven at high revolution, so that the hydrogen gas in the fuel gas pipe system 3 is circulated, and also, a part of the supplied hydrogen gas (here, $Q_2$) is extruded, and as a result, the water in the anode of the fuel cell 2 and in the fuel gas pipe system 3 is collected by the gas-liquid separator 30. Thereafter, the control unit 7 outputs an exhaust/drain open command (S7). The exhaust/drain valve 31 is then opened. Thereafter, a water exhaust is attained by the water collected in the gas-liquid separator 30 being flown to the exhaust/drain flow path 25, and nearly simultaneously, the hydrogen gas and hydrogen-off gas which contain impurities in the anode of the fuel cell 2 and in the fuel gas pipe system 3 are exhausted by being extruded by a part of the supplied hydrogen gas (here, $Q_1$). At this point, the control unit 7 outputs an exhaust/drain valve close command to close the exhaust/drain valve (S8). The control unit 7 closes all the valves of the hydrogen gas/oxidant gas pipe systems leading to the fuel cell 2 to attain a sealing state of the fuel cell 2, thereby ending the operation end processing.

Meanwhile, if the control unit 7 determines that the outdoor air temperature is higher than the freezing point (S5: NO), the control unit 7 does not give the power generation command and the component scavenge command, and outputs the exhaust/drain valve open command (S7). The exhaust/drain valve 31 is then opened. Thereafter, the hydrogen gas and hydrogen-off gas which contain impurities in the anode of the fuel cell 2 and in the fuel gas pipe system 3 are exhausted by being extruded by a part of the supplied hydrogen gas (here, $Q_1$). At this point, the control unit 7 outputs the exhaust/drain valve close command to close the exhaust/drain valve (S8). The control unit 7 closes all the valves of the hydrogen gas/oxidant gas pipe systems leading to the fuel cell 2 to attain a sealing state of the fuel cell 2, thereby ending the operation end processing.

With the above-described operation, the state in which at least the anode of the fuel cell 2 is filled with hydrogen gas is attained after the end of the operation of the fuel cell system 1 both in the high-temperature environment and in the low-temperature environment. Accordingly, carbon oxidation of the anode can be prevented. This is because, for example, even if air remaining in the cathode flows into the anode via cross leakage, as long as the anode is sufficiently filled with hydrogen gas, the filled hydrogen gas reacts with oxygen, thereby consuming oxygen. As described above, deterioration of the fuel cell after the end of the operation can be prevented with the fuel gas at the optimum flow rate in accordance with the temperature environment.

Also, in the low-temperature environment, a water exhaust is performed when the operation is ended, and therefore, the water remaining in the fuel cell 2 due to the lowering of the temperature inside the fuel cell 2 after the end of the operation can be prevented from freezing. Also, high efficiency is obtained compared with the case of obtaining a current necessary for the operation end processing from a power accumulating means, such as a battery or a capacitor, in which an output tends to decrease in the low-temperature environment. From another point of view, this means that electric power of the power accumulating means such as the battery or the capacitor is left for the start of the fuel cell system.

In the high-temperature environment, operations not required under the high-temperature environment, such as the water exhaust, are not performed, thereby simplifying the operation end processing. Accordingly, the fuel efficiency for the case of the high-temperature environment can be improved.

3. Modification Example of the Fuel Cell System According to the Embodiment of the Invention The embodiment of the invention has been described above, but the invention is not limited to this embodiment, and various embodiments may be made within a range not departing from the gist of the invention. For example, the modification example below may be made.

In the above embodiment, the temperature outside the fuel cell vehicle is measured, and the injection pressure of the injector 28 is increased based on the outdoor air temperature; however, the invention is not a limited to this. For example, the temperature acquired by a temperature sensor in a fuel cell system or an external temperature sensor connected to the fuel cell system may be employed. In such cases, the fuel gas flow rate at the start of operation end processing is preferably controlled by estimating, from the acquired temperature, a temperature state inside a fuel cell after the end of operation (for example, a high possibility of a temperature equal to or lower than the freezing point). Also, the fuel gas flow rate at the start of operation end processing is preferably controlled by estimating a temperature state inside a fuel cell after the end of operation (for example, a high possibility of a temperature equal to or lower than the freezing point) after additionally considering information on, e.g., a weather forecast which is obtained from another information acquisition means.

In the above embodiment, the flow rate $Q_1$ is set such that at least the anode of the fuel cell 2 is filled with hydrogen after the end of the operation, but the invention is not limited to this. For example, the flow rate $Q_1$ may be set such that the cathode is also filled with hydrogen.

Although each of the above embodiments has described the case where the fuel cell system of the invention is mounted on a fuel cell vehicle, the fuel cell systems of the invention may be mounted not only on fuel cell vehicles but also on various other mobile objects (e.g., robots, ships and airplanes). The fuel cell systems of the invention may also be applied to stationary power generating systems used as power generating equipment for constructions (e.g., houses and buildings).

What is claimed is:

1. A fuel cell system comprising: a fuel cell; a fuel gas supply system that supplies a fuel gas to the fuel cell; and an oxidant gas supply system that supplies an oxidant gas to the fuel cell, wherein when operation end processing for the fuel cell system is started, a flow rate of the fuel gas supplied to the fuel cell is increased by a predetermined amount that is determined based on a temperature environment of the fuel cell system;

when the temperature environment has a temperature equal to or lower than a predetermined temperature, the predetermined amount is determined based on a total value of at least a first fuel gas flow rate necessary for leaving the fuel gas in the fuel cell at the end of the operation end processing and a second fuel gas flow rate necessary for discharging water in the fuel cell to the outside during the operation end processing; and the predetermined amount is determined based on a total value obtained by further adding, to the first and second fuel gas flow rates, a third fuel gas flow rate necessary for the fuel cell to output, during the operation end processing, a current necessary for device operation during the operation end processing.

2. The fuel cell system according to claim 1, wherein, when the temperature environment has a temperature higher than the predetermined temperature, the predetermined amount is determined based on the first fuel gas flow rate.

3. The fuel cell system according to claim 1, wherein a supply pressure of the fuel gas is increased by an injector provided in the fuel gas supply system, thereby increasing the flow rate of the fuel gas.

4. A mobile object which is provided with the fuel cell system according to claim 1.

5. The fuel cell system according to claim 2, wherein a supply pressure of the fuel gas is increased by an injector provided in the fuel gas supply system, thereby increasing the flow rate of the fuel gas.

6. A mobile object which is provided with the fuel cell system according to claim 2.

* * * * *